(No Model.)
G. H. CONDICT.
ELECTRIC RAILWAY.
No. 384,562. Patented June 12, 1888.
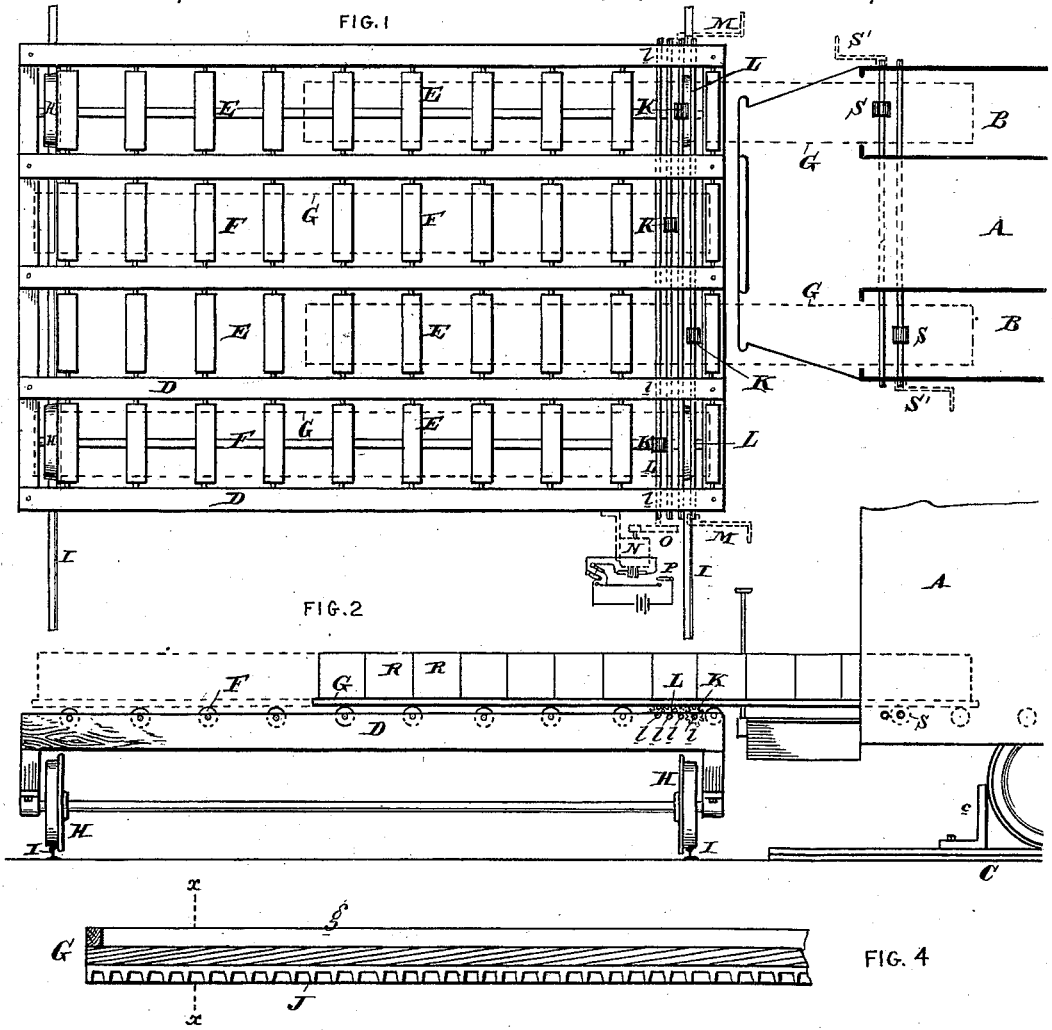

UNITED STATES PATENT OFFICE.

G. HERBERT CONDICT, OF PHILADELPHIA, PENNSYLVANIA, ASSIGNOR TO THE ELECTRIC CAR COMPANY OF AMERICA, OF PENNSYLVANIA.

ELECTRIC RAILWAY.

SPECIFICATION forming part of Letters Patent No. 384,562, dated June 12, 1888.

Application filed January 16, 1888. Serial No. 260,804. (No model.)

*To all whom it may concern:*

Be it known that I, G. HERBERT CONDICT, of the city and county of Philadelphia, and State of Pennsylvania, have invented an Improvement in Electric Railways, of which the following is a specification.

My invention relates to electric railways; and it consists of certain improvements, which are fully set forth in the following specification and shown in the accompanying drawings, which form part thereof.

In those systems of electric railways in which storage or other batteries upon the car are used, great difficulty is experienced in removing the exhausted batteries from the car and replacing them with others in a charged condition. This exchange must be made as soon as the batteries on the car have lost their power, and when it is done by hand much time is consumed, and the operation is performed with trouble and delay and much waste of labor.

It is the object of my invention to obviate this difficulty, and to accomplish that end I have devised the apparatus herein described, whereby the exchange of batteries is quickly and easily accomplished by mechanical means.

In carrying out my invention I provide the car or vehicle with suitable guides or supports, preferably under the seats and upon each side of the car. Upon these guides the slide or frame upon which the batteries are supported runs. The car having the spent batteries is brought close to a truck or carriage upon a track substantially at a right angle to the truck-track. The exhausted or spent batteries on their slides or frames are drawn out of the car upon this truck, and after shifting the truck are replaced by others freshly charged.

Referring for greater particularity to the drawings, Figure 1 is a plan view of a car and the transferring-truck embodying the principles of my invention. Fig. 2 is a side elevation of the same. Fig. 3 is a cross-sectional view of the slide or frame upon which the batteries are supported, taken through the line *x x* of Fig. 4; and Fig. 4 is a longitudinal section of the same through the line *y y* of Fig. 3.

A is the car, the construction of which is unimportant as regards this invention, and is fully set forth and claimed in another application of mine for Letters Patent, filed January 16, 1888, and numbered 260,805.

B and B are two compartments, preferably under the seats of the car on each side, and may extend throughout its entire length or only a part. These compartments are intended to receive the batteries, and they are provided with guides, rollers, &c., as is fully set forth in my application for Letters Patent, referred to above.

C is the track upon which the car A runs. It is best to provide this track with a stop or buffer, *c*, in order that the car may be brought to a stop at the right place and close to the transferring-truck.

D is a truck of a convenient size to hold the desired number of frames or slides. It is provided with wheels H and runs upon a track, I, which is practically at right angles with the track C. As the object of this truck is to hold the frames or slides of batteries, it should be constructed to suit that purpose, and may be varied in size and shape to suit the various exigencies of different cases. The construction I prefer, however, is that shown in the drawings, where the truck is constructed to hold four frames or slides.

E E and F F are four series of rollers supported between the timbers of the truck and extending slightly above the top of the truck. The purpose of these rollers is to reduce friction and make the frames or slides pass easily from the car to the truck, or vice versa; and it is evident that they might be dispensed with, and any other means, such as longitudinal guides or wheels, be substituted (see Fig. 3, dotted lines) which would effect the same result.

G are the frames or slides upon which the battery-cells R are supported. These frames or slides G are grooved on their under surfaces longitudinally, as at *j*, and in this groove I place a rack, J, the lower part of which is preferably arranged so as not to project below the under surface of the slide, in order that it may rest on the rollers F or E and pass smoothly over them. The upper part of this slide may have longitudinal side guard-strips, *g g*, and also a central division-strip, *g'*, between which the battery-cells R are arranged and held against lateral displacement. The particular details of this slide are immaterial to the invention, broadly considered, as are also its length and general shape. In the ordinary cars, having seats on each side, two of these slides G are employed.

L are shafts extending across the truck longitudinally and journaled to it at l, preferably on the side of the truck presented to the car. I prefer to use as many of these shafts as there are series of rollers E E and F F; but it is evident that only one shaft may be used, if desired. These shafts are provided with pinions K. If the number of shafts used is the same as the number of series of rollers E E and F F, each shaft is provided with one pinion K, located in line with the different series of rollers. These pinions mesh with the teeth of the racks J on the bottom of the battery slides or frames G, so that when the shafts are rotated these slides or frames G will be moved forward or back, toward the car or from it, according to the direction of the motion imparted to the shafts.

M are cranks, which may be detachably secured to the shafts L, by which motion is given. One removable crank may be used, if desired, and changed from one shaft to another. The shafts L preferably extend entirely across the truck, so as to expose both ends, upon which two cranks may be placed to rotate the shaft, and thus make the work more easy, as twice the power may be readily applied.

N is an electric motor having a motor-circuit, P, and may connect by gearing O with the shaft L, by which motion may be imparted in either direction, a reversing-switch being shown. It is evident that the application of electricity to rotate the shafts is readily applied, and, as an illustration, I have shown the application to one shaft; but the means of imparting motion to these shafts L is evidently immaterial to the broad principles of my invention, and any method may be employed, though that shown in the drawings is preferred.

S is a pinion, similar to the pinions K, located on the car, one under each seat, to receive the frames or slides G, and meshing with the teeth of the racks J.

In operation the truck D is provided with two sets of slides or frames, G, upon which are located the battery-cells R. These slides are preferably stationed on two alternate sets of rollers F F, the distance between which is substantially equal to the distance between the compartments under the car-seats B. The other two alternate sets of rollers, E E, are unprovided with slides. The car A is backed up to the track I, and the truck D is moved up so that the empty sets of rollers E E are in line with the car-seats. The pinions S on the cars, together or separately, are set in motion, preferably by a crank-arm, S', and the two slides G (the battery-cells on which have been exhausted) are drawn out. After their ends reach the truck D, the shafts provided with pinions in the sets of rollers E E are rotated, and the slides are drawn out of the car upon the truck, which is then moved so as to bring the sets of rollers F F in line with the car-seats, and by reversing the operation before performed the slides or frames G, with the charged batteries, are moved from the truck upon the car. The batteries are then coupled up, either in series or otherwise, to suit the use to be made of them, and the car is started off. The truck may now be drawn back and the battery-cells upon the two frames taken from the car recharged.

It is evident that the rollers on the truck may be dispensed with and any form of rigid guides used; but the rollers reduce friction and are decidedly preferable, and are what I use in practice.

While it is preferable to remove these slides from the back of the car, it is evident that it may be done otherwise, if found convenient in any particular case, and in general the construction, &c., of the car is not an essential part of this invention, and has been described and claimed in my other application hereinabove referred to.

Such matters as are here shown and not claimed are not given to the public, but form subject-matter of my application filed January 16, 1888, and numbered 260,805.

As to the mere details of construction herein set out, while they are those preferred, they are not to be considered limitations of my invention, as it is clear that they may be in many ways varied without departing from it.

Having now described my invention, what I claim as new, and desire to secure by Letters Patent, is—

1. The combination of a car-track with battery-slide carriage movable transversely across the line of said track, a battery-supporting slide having a rack, a pinion on said battery-slide carriage, and suitable means to rotate the pinion to propel the slide from the carriage into the car, or vice versa.

2. The combination of a car-track with battery-slide carriage movable transversely across the line of said track, a battery-supporting slide having a rack, a pinion on said battery-slide carriage, and suitable means to rotate the pinion to propel the slide from the carriage into the car, or vice versa, and a car adapted to receive the battery-slide, provided with a pinion to assist the pinion on the slide-carriage and to start the battery-slide from the car onto the slide-carriage.

3. The combination of a car-track with battery-slide carriage movable transversely across the line of said track and provided with rollers, a battery-supporting slide having a rack and adapted to run upon said rollers, a pinion on said battery-slide carriage, and suitable means to rotate the pinion to propel the slide from the carriage into the car, or vice versa.

4. The combination of a car-track with a battery-slide carriage movable transversely across the line of said track, a series of rollers on said carriage arranged parallel with each other to form a line parallel with the track, a pinion arranged on said carriage at or near the end adjacent to the car-track, and a battery-slide having a rack, with which the pinion meshes, and adapted to run upon said rollers.

5. The combination of a car-track with a battery-slide carriage movable transversely across the line of said track, a series of rollers on said carriage arranged parallel with each other to form a line parallel with the track, a pinion arranged on said carriage at or near the end adjacent to the car-track, a battery-slide having a rack, with which the pinion meshes, and adapted to run upon said rollers, and a shaft secured to said pinion and extending to opposite sides of the carriage, whereby power may be applied at both ends.

6. The combination of a car-track with a battery-slide carriage movable transversely across the line of said track and having supports for four battery-slides, and having a pinion for each of said supports to propel the four slides, and four battery-slides having racks adapted to be supported upon said carriage and propelled to or from it by the pinions.

7. The combination of a car-track with a battery-slide carriage movable transversely across the line of said track and having roller-supports for four battery-slides, and having a pinion for each of said supports to propel the four slides, and independent shafts extending across the carriage for operating each of said pinions, and four battery-slides having racks adapted to be supported upon said carriage and propelled to or from it by the pinions.

8. The combination of a car-track with a battery-slide carriage movable transversely across the line of said track and having roller-supports for four battery-slides, and having a pinion for each of said supports to propel the four slides, and four battery-slides having racks adapted to be supported upon said carriage and propelled to or from it by the pinions.

9. The frame D, supported on wheels H, in combination with supporting-rollers E F, arranged in parallel rows, and a pinion, K, at one end of each of said rows of rollers.

10. The frame D, supported on wheels H, in combination with supporting-rollers E F, arranged in parallel rows, a pinion, K, at one end of each of said rows of rollers, and independent shafts I, extending across the frame D.

11. The combination of a car-track with a battery-slide carriage movable transversely across the line of said track, a battery-supporting slide having a rack, a pinion on said battery-slide carriage, suitable means to rotate the pinion to propel the slide from the carriage into the car, or vice versa, an electric motor to rotate the pinion, a motor-circuit, and a switch to control the motor.

12. The combination of a car-track with a battery-slide carriage movable transversely across the line of said track and having supports for four battery-slides, and having a pinion for each of said supports to propel the four slides, and a separate battery-slide for each of said supports.

13. The combination of a car having one or more battery-slide supports and an opening thereto, a movable battery-slide carriage movable with respect to said car, so as to pass the openings to said slide-supports, and in which the battery-slide carriage has two or more parallel battery-slide supports and twice as many battery-slides as the car has battery-slide supports, whereby the slides on the car having expended batteries may be run out on the carriage and then the carriage shifted and other slides having charged batteries run into the same openings from the same carriage which received the slides from the car.

In testimony of which invention I hereunto set my hand.

G. HERBERT CONDICT.

Witnesses:
R. M. HUNTER,
RICHD. S. CHILD, Jr.